(12) United States Patent
Blair et al.

(10) Patent No.: US 6,483,724 B1
(45) Date of Patent: Nov. 19, 2002

(54) DC/DC ZVS FULL BRIDGE CONVERTER POWER SUPPLY METHOD AND APPARATUS

(75) Inventors: Barry Olen Blair, Garland, TX (US); Gregory H. Fasullo, Dallas, TX (US); James Edward Harvey, Heath, TX (US); Donald Marabell, Dallas, TX (US)

(73) Assignee: Valere Power, Inc., Dallas, TX (US)

( * ) Notice: Subject to any disclaimer, the term of this patent is extended or adjusted under 35 U.S.C. 154(b) by 0 days.

(21) Appl. No.: 10/077,426

(22) Filed: Feb. 15, 2002

(51) Int. Cl.[7] .............................................. H02M 3/335
(52) U.S. Cl. ........................................ 363/17; 363/132
(58) Field of Search ................................... 363/17, 132

(56) References Cited

U.S. PATENT DOCUMENTS

| | | | |
|---|---|---|---|
| 4,639,849 A | | 1/1987 | Noworolski et al. |
| 4,860,189 A | | 8/1989 | Hitchcock |
| 4,910,440 A | * | 3/1990 | McMullin ............... 315/209 T |
| 5,198,969 A | | 3/1993 | Redl et al. |
| 5,691,607 A | * | 11/1997 | Zawislak et al. ........ 315/209 R |
| 6,016,258 A | | 1/2000 | Jain et al. |
| 6,163,466 A | | 12/2000 | Davila, Jr. et al. |

OTHER PUBLICATIONS

Jovanovic, Milan M., et al.; Abstract of "Zero–Village–Switching Technique in High–Frequency Off–Line Converters"; *IEEE* (CH2504–9/88/0000–0023); 1988; pp. 23–32. (No Month).

Hayes, J.G. et al.; Abstract of "Zero–Voltage Switching in a Constant Frquency Digitally Controlled Resonant DC–DC Power Converter"; *IEEE* (CH2504–9/88/0000–0360); 1988; pp. 360–367. (No Month).

Andreycak, Bill; Abstract of "Phase Shifted, Zero Voltage Transition Design Considerations and the UC3875 PWM Controller"; Unitrode Corporation; May 1977; pp. 1–14; SLUA107 (U–136A); Merrimack, NH.

* cited by examiner

*Primary Examiner*—Shawn Riley
(74) *Attorney, Agent, or Firm*—Carr Law Firm, L.L.P.

(57) ABSTRACT

Disclosed is a DC/DC converter apparatus comprising a full bridge non-resonant pulse-width-modulated (PWM) switching circuit, which includes inductive device(s), clamp diodes, and an output transformer rectifier and filter circuit. Capacitive and diode elements associated with bridge switching devices operate to switch current through the switches at substantially zero voltage (ZVS). The inductor element and clamp diodes are used to reduce the primary transition shoot through current resulting from reverse recovery of the transformer secondary rectification stage while also reducing emi and semiconductor stresses.

13 Claims, 3 Drawing Sheets

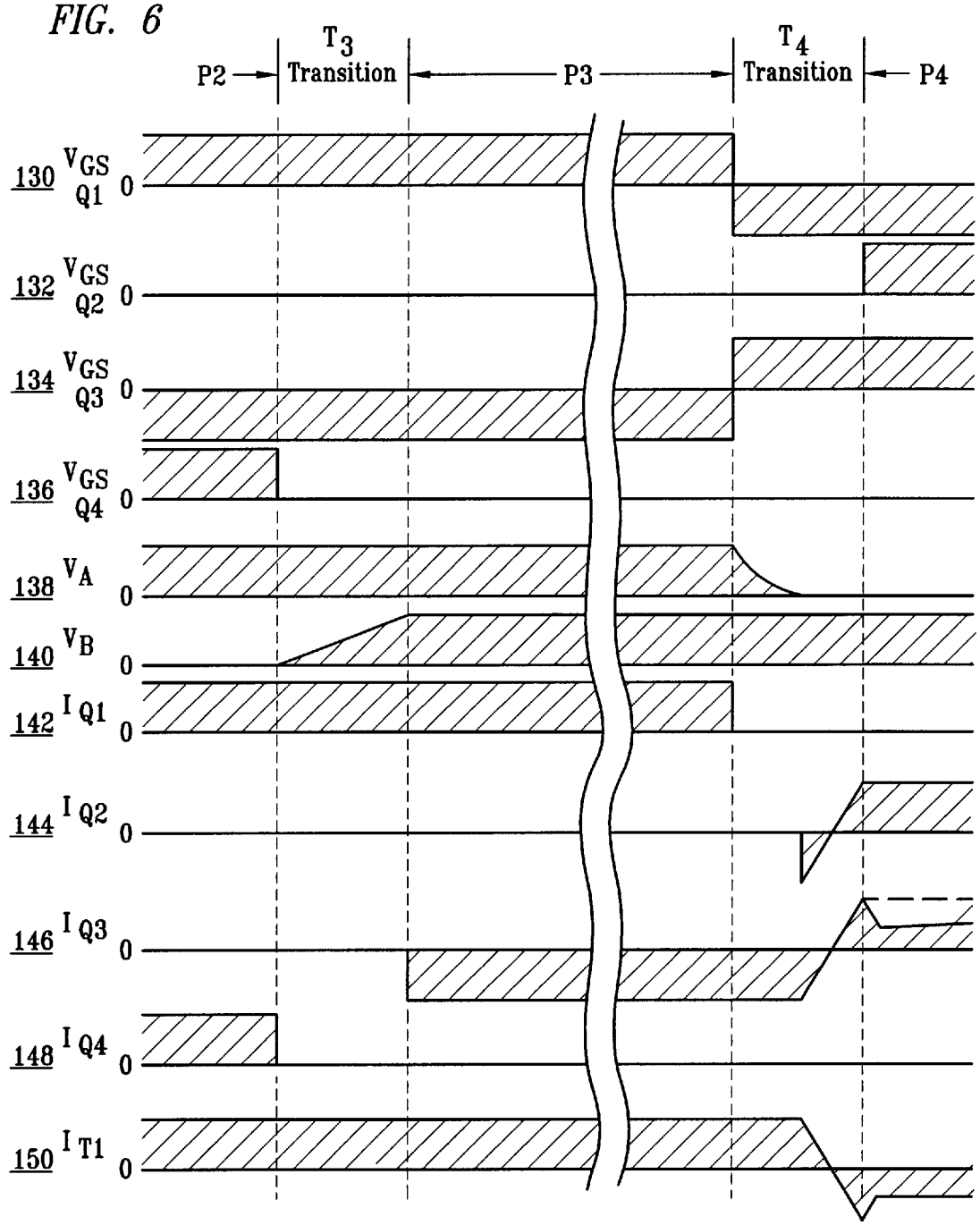

DC/DC ZVS FULL BRIDGE CONVERTER POWER SUPPLY METHOD AND APPARATUS

TECHNICAL FIELD

The present invention relates in general to power converters and, more specifically, to a full bridge DC/DC converter having an improved ZVS (Zero Voltage Switching) operation mode and primary winding clamp circuit to minimize secondary reverse recovery current losses.

BACKGROUND

A common practice in the field of power conversion is to use switching power supplies to convert DC voltage of one level to an isolated DC voltage at a second level. A circuit topology that is well suited for this purpose is the full bridge converter. One of the major disadvantages to switching power conversion is the losses associated with the switching elements in the power converter, and a common approach is to utilize nearly zero voltage switching (ZVS) to minimize these losses.

A common ZVS topology for a prior art full bridge converter is a phase-shifted full bridge. Such a circuit is described in detail in a Texas Instruments (formerly Unitrode Corp.) generated application note U-136A entitled "Phase Shifted Zero Voltage Transition Design Considerations and the UC3875 PWM Controller," published in May 1997 and presently available from Texas Instruments, Inc. The phase shifted full bridge described therein relies on the parasitic elements of the switching elements, typically MOSFET transistors, and transformer primary winding inductance to transition the voltage across the switching elements to zero prior to turning on these switches. Since the switching losses are a function of the voltage across the switch prior to turn on, this approach reduces these losses to near zero under most operating conditions or characteristics.

While the phase-shifted full bridge minimizes switching losses associated with the primary circuit elements, it does not address inherent switching losses caused by output rectifier diode reverse recovery. These losses are primarily associated with the reverse recovery time of the secondary diodes, and result in ringing and emi (electromagnetic interference) when combined with parasitic elements of the main power transformer. Common prior art approaches to mitigate these losses have included using one or more of dissipative snubbers, saturable reactors, primary clamping circuits and low loss active filters.

By reducing the rate of change of current in the output rectifiers, the peak reverse recovery current is limited in some of the prior art circuits. Clamping elements on the primary side of the power train in other of those circuits have resulted in the capture of a majority of the reverse recovery energy in the primary resonant inductors, thus minimizing the dissipated energy.

Although these attempts to mitigate losses have, to various degrees, improved power dissipation efficiency from circuits not using the described approaches, there are still drawbacks of existing known circuits. These include, among others, cost, control, excessive emi and excessive switching losses.

It would thus be desirable to provide a converter with increased power conversion efficiency whereby a given size converter container can provide a larger amount of output power, or a given power rated converter can be packaged in a smaller container. It would also be desirable to provide a converter that minimizes component stresses and reduces generated high frequency interference signals, such as emi, for example.

SUMMARY OF THE INVENTION

The present invention comprises a full bridge non-resonant pulse-width-modulated (PWM) switching circuit. The circuit comprises four switches, inductive device(s), clamp diodes, a transformer and an output rectification stage including a filter connected to a transformer secondary. Capacitor and diode elements associated with the switching elements (part of the switching devices or external) are operatively connected to the four switches so as to switch current through the switches at substantially zero voltage (ZVS). The inductive device(s) and clamp diodes reduce the primary transition shoot through current resulting from reverse recovery of the transformer secondary rectification stage. The optional use of a current doubler as part of the filter circuit operates to reduce conduction losses in the main power transformer whereby even greater power conversion efficiency is obtained.

BRIEF DESCRIPTION OF THE DRAWINGS

For a more complete understanding of the present invention, and its advantages, reference will now be made in the following Detailed Description to the accompanying drawings, in which:

FIG. 6 is a transition-timing diagram expansion of two selected transitions of the waveforms of FIG. 5.

DETAILED DESCRIPTION

In the following description, various components will have dual designations of numbers and letters to simplify the association between voltage and current waveforms and the respective components.

Figure 1:
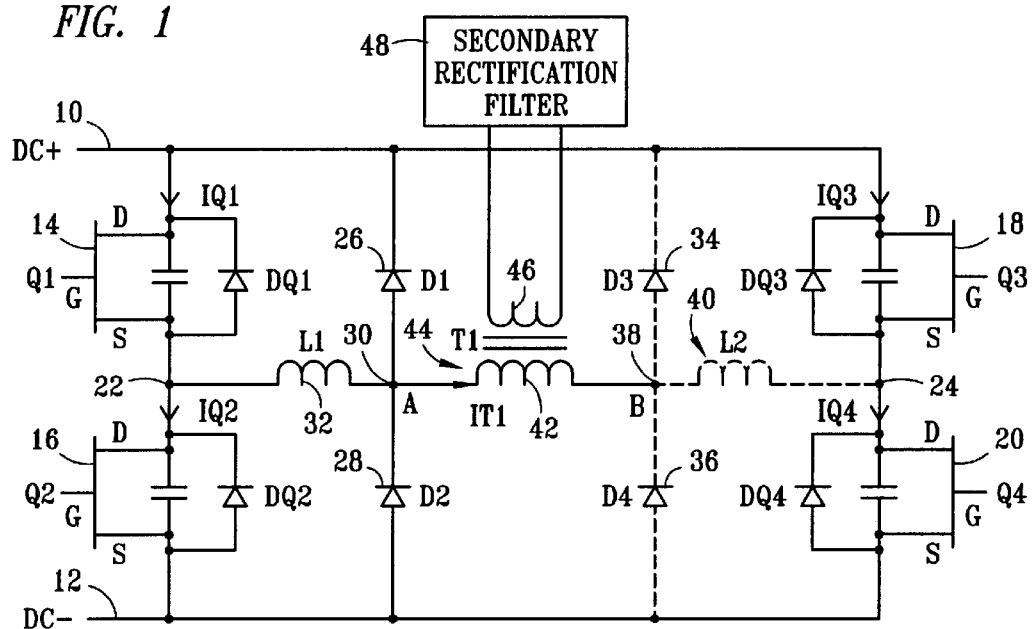
FIG. 1 is a schematic diagram of a full bridge switching circuit DC/DC converter.

In FIG. 1, a positive direct current power supply voltage terminal is designated as 10 while the negative terminal, which may be at ground, is designated as 12. A pair of MOSFET (metal oxide on silicon field effect transistors) 14 (Q1) and 16 (Q2), hereinafter referred to simply as FETs for convenience, are shown connected in series between terminals 10 and 12 to form one leg (left hand) of a bridge converter. The drain "D" of FET 14 is connected to terminal 10 while the source "S" of FET 16 is connected to terminal 12. A second pair of FETs 18 and 20 are also connected between terminals 10 and 12 in a like manner to form the other leg (right hand) of the bridge converter. Each of the referenced FETs is shown associated with a capacitance and a diode. MOSFETs inherently have a drain to source capacitance and a body diode effect in parallel therewith. Each of these diodes is designated with a "D" followed by the FET letter designator. As an example, the diode associated with FET 14 is labeled DQ1. On the other hand, where reference is made to the inherent capacitance of a capacitive element of switch Q1, it would be referred to as CQ1. While other switches, solid state or otherwise, may be used to practice the present invention, if they do not have sufficient inherent capacitance and similar diode characteristics, they may require such components external to the switching device, as these component characteristics are required to practice this invention. Each of the illustrated FETs include a switching signal input terminal or gate labeled "G". As will be mentioned in detail later, a constant width square wave signal is applied to the gates of FETs Q1 and Q3 and is different from the PWM (pulse width modulated) signal applied to the gates of FETs Q2 and Q4.

A terminal intermediate FETs 14 and 16 is labeled 22. A similar terminal intermediate FETs 18 and 20 is labeled 24. A pair of diodes 26 (D1) and 28 (D2) are connected in series between terminals 10 and 12 with the cathode of diode 26 connected to terminal 10 and the anode of diode 28 connected to terminal 12. A common point or terminal between the diodes 26 and 28 is labeled 30 and further as "A". An inductance 32 (also labeled L1) is connected between terminals 22 and 30. The diodes 26 and 28, along with inductance 32, form a first primary clamp circuit. A pair of diodes 34 and 36, having an intermediate terminal 38 (further designated as "B"), are connected in a like fashion between terminals 10 and 12. An inductance 40 (also labeled L2) is connected between terminals 24 and 38. The components 34, 36 and 40 are shown in dash line format as the invention may be practiced by replacing these 3 components with a short between terminals 38 and 24. A decision to use two primary clamp circuits rather than one may involve packaging considerations since two physically smaller inductors can provide the same performance as one large inductor. A primary winding 42 of a transformer 44 (also designated as "T1") is connected between terminals 30 and 38. A secondary winding 46 of transformer 44 is connected to a secondary rectification and filter circuit block 48.

Figure 2:
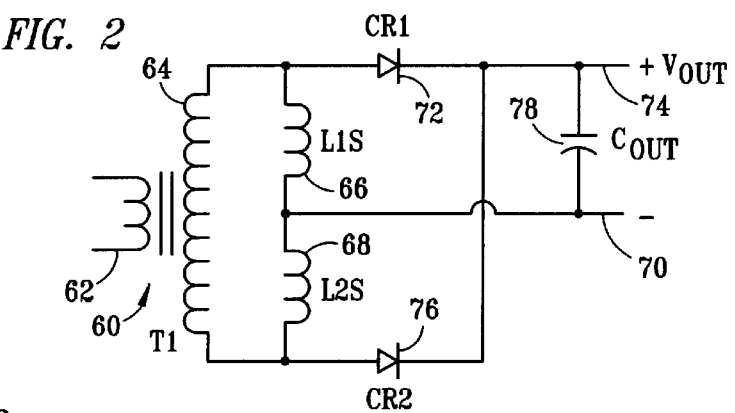
FIG. 2 illustrates an output rectification filter using half wave rectification and including current doubler inductances.

FIG. 2 shows a transformer 60 (T1) having a primary winding 62 and a secondary winding 64. This transformer is equivalent to transformer 44 of FIG. 1. A pair of inductances 66 (L1S) and 68 (L2S) are shown connected in series across winding 64. A common point 70, between the inductances 66 and 68, also serves as a negative voltage output terminal. A first rectifier diode 72 (CR1) is connected between one end of winding 64 and a positive voltage output terminal 74. A second rectifier diode 76 (CR2) is connected between the other end of winding 64 and the positive voltage output terminal 74. A filter capacitor 78 (Cout) is connected across filter output terminals 70 and 74.

Figure 3:
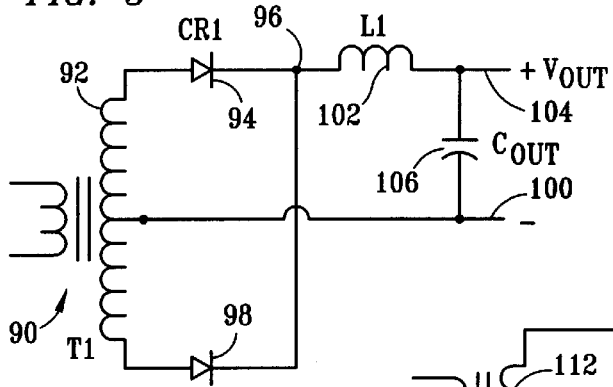
FIG. 3 illustrates an output rectification filter using half wave rectification and a center-tapped transformer secondary.

In FIG. 3, a transformer 90 is shown with a center tapped secondary winding 92. This transformer 90 is operationally equivalent to transformer 44 of FIG. 1 in transferring signals to the block 48. A first rectifier diode 94 (CR1) is connected between one end of winding 92 and a junction point 96. A second rectifier diode 98 (CR2) is connected between the other end of winding 92 and the junction point 96. A negative voltage filter output terminal 100 is connected to the center-tap of winding 92. An inductance 102 is connected between junction point 96 and a positive voltage filter output terminal 104. A filter capacitor 106 (Cout) is connected across filter output terminals 100 and 104.

Figure 4:
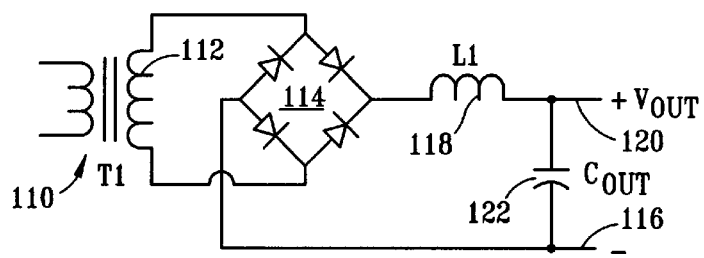
FIG. 4 illustrates an output rectification filter using full wave rectification and a non-center-tapped transformer secondary.

In FIG. 4, a transformer 110 (T1) is shown having a secondary winding 112. This transformer 110 is equivalent to transformer 44 of FIG. 1. A full bridge rectifier circuit 114 has its input terminals connected across winding 112. One output terminal of circuit 114 is connected to a negative voltage filter output terminal 116. An inductance 118 is connected between the other output terminal of circuit 114 and a positive voltage filter output terminal 120. A filter capacitor 122 (Cout) is connected across filter output terminals 116 and 120.

Figure 5:
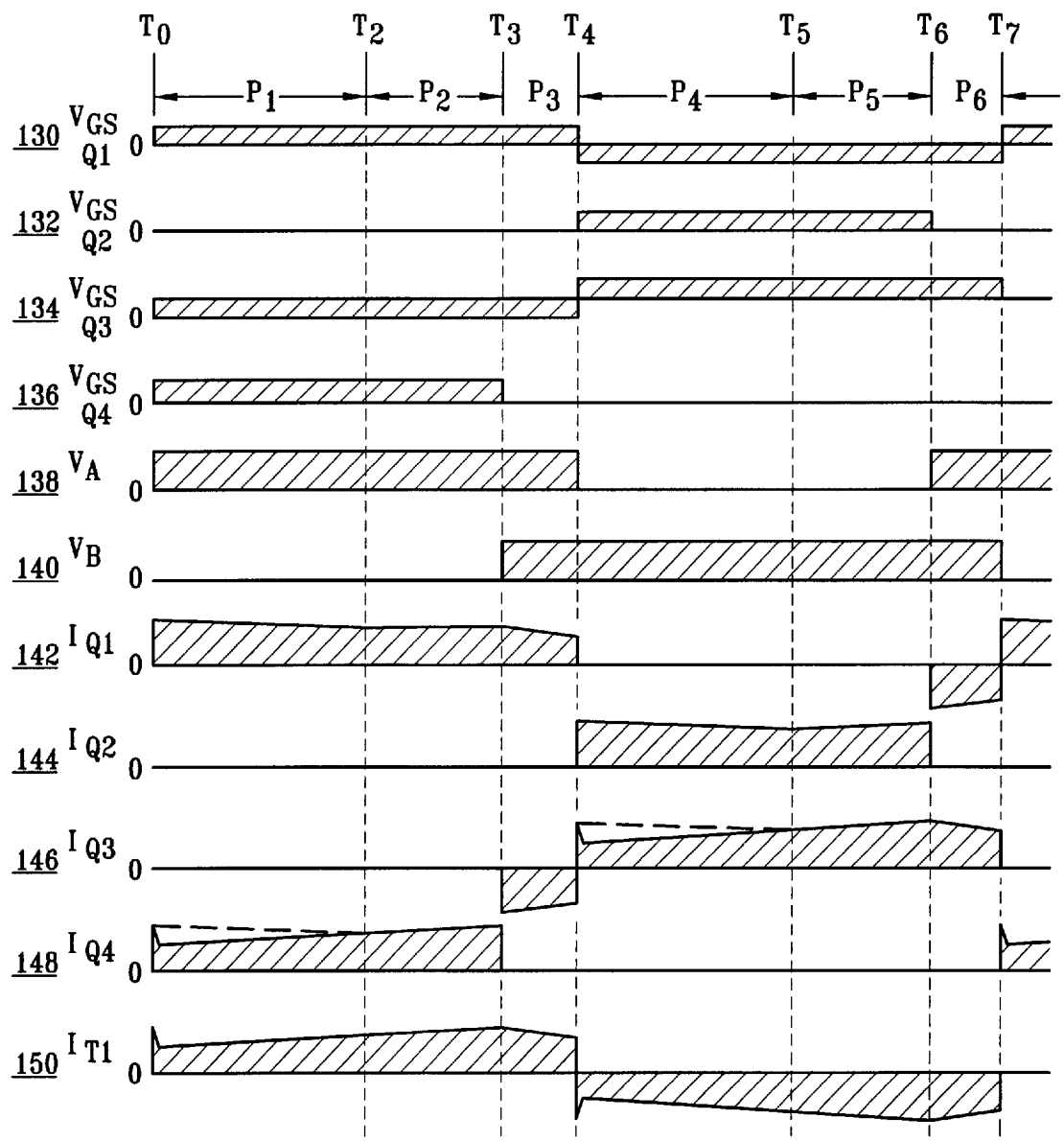
FIG. 5 is a complete switching cycle timing diagram of transistor and transformer voltage and current levels generated by the circuit shown in FIG. 1.

In FIG. 5, voltage and current waveforms 130 through 150 occurring over six periods of time are illustrated. Reference signal transition times T0 through T7 are designated with different length periods P1 through P6 shown between these stated reference times. Waveforms 130, 132, 134, and 136 show, respectively, the voltage from gate to source of FETs Q1, Q2, Q3, and Q4. Waveforms 138 and 140 illustrate the voltage at junction points A (30) and B (38) in FIG. 1. Waveforms 142, 144, 146, and 148 illustrate the direction and amplitude of current flowing between the drain and source terminals of FETs Q1, Q2, Q3, and Q4, respectively. Waveform 150 illustrates the direction and amplitude of current flowing in the primary winding 42 of transformer 44.

For further clarification, FIG. 6 expands the time scale to better illustrate the current and voltage alterations during signal transition times T3 and T4. Although not specifically shown, similar, but inverted, actions would also take place during transition times T6 and T7. In the description following, it should be noted that the times T3 and T6 can vary with respect to time T0, since these are indicative of the width of the pulse width modulated signal.

Referring now to FIG. 1, the circuit shown provides low or zero voltage switching (ZVS) and reduction of secondary rectification reverse recovery current. A DC voltage supply between terminals 10 and 12 of up to 400 V is typical for most applications. As expanded upon in FIGS. 2, 3 and 4, the rectification and filter block 48 may comprise a current doubler and center-tapped or full wave bridge rectifier circuits. The output filter stage is typically a two-pole voltage filter formed by inductance(s) and capacitance.

Reference will now be made to FIGS. 1, 5 and 6. It will be assumed for the purpose of this discussion that both primary clamp circuits (using L1 and L2) are connected as shown and a current doubler circuit, such as shown in FIG. 2, is being used in block 48.

During time period P1, FETs Q1 and Q4 are conducting as shown by gate to source voltage waveforms 130 and 136, as well as by current waveforms 142 and 148. Diodes D1 and D4 are also conducting. At this same time, diodes D2 and D3, as well as FETs 16 and 18 (Q2 and Q3), are non-conducting. Switches Q1 and Q4 are controlled to an ON state resulting in voltage waveform VA at junction point 30 being high and voltage VB at junction point 38 being low, as shown in waveforms 138 and 140. The voltage supply is connected across the primary winding 42 of transformer T1 and the secondary load currents, flowing in filter 48, are reflected to primary winding 42. Inductances L1 and L2 (32 and 40) are energized with reflected T1 secondary winding rectifier reverse recovery current and load current. This results in diodes D1 and D4 (26 and 36) conducting the secondary rectifier reverse recovery current.

During the transition time T2, between periods P1 and P2, diodes D1 and D4 switch to a non-conducting state, although FETs Q1 and Q4 remain conducting. During this transition time T2, diodes D2 and D3, as well as FETs Q2 and Q3 are non-conducting. Diodes D1 and D4 switch to a non-conducting state as the reflected T1 secondary winding load current increases to match the current of inductances 32 and 40 (L1 and L2).

During time period P2 (between T2 and T3), diodes D1, D2, D3, and D4, as well as FETs Q2 and Q3, remain non-conducting. Switches Q1 and Q4 remain controlled to an ON state, resulting in voltage waveform VA being high and voltage VB being low, as shown in waveforms 138 and 140. The voltage supply is therefore connected across the primary 42 of transformer T1 and the secondary load current is reflected to the T1 primary winding 42 as well as to inductances 32 and 40 (L1 and L2).

During the transition time T3, between periods P2 and P3, FET switch Q4 is controlled to or turned to an OFF state resulting in the voltage at junction point 38 rising in amplitude, as shown in VB waveform 140 in both FIGS. 5 and 6. This rising voltage causes diode element DQ3, of FET 18, to conduct current.

During time period P3, FET switch Q1 remains controlled to an ON state, thus keeping the voltage at junction point 30 high, as shown in waveform 138. Waveform VB remains high as secondary load currents reflected to the T1 primary winding 42 maintain diode element DQ3, of FET Q3, in a conductive state. FETs Q2 and Q3 remain non-conducting as do diodes D1, D2, D3, and D4.

During the transition T4, between periods P3 and P4, FET Q1 is controlled to an OFF state, resulting in the voltage VA resonant transition to a low voltage state and causing diode element DQ2 to conduct. FET switch Q3 is controlled to an ON state with ZVS and takes over conduction from diode element DQ3, of FET Q3. The voltage supply is therefore connected across the primary winding 42 of transformer T1. Further, during this transition time T4, the secondary rectifier reverse recovery and load currents are reflected to the T1 primary winding as well as to inductances L1 and L2 (32 and 40).

During period P4, FET switch Q2 is controlled to an ON state with ZVS and takes over conduction from diode element DQ2. Voltage waveform VA remains low and voltage waveform VB remains high. The voltage supply is therefore connected across the primary winding 42 of transformer T1 and the secondary winding load currents from block 48 are reflected to the T1 primary winding 42. Inductances L1 and L2 are energized with reflected T1 secondary winding rectifier reverse recovery and load currents. This results in diodes D2 and D3 conducting the T1 secondary rectifier reverse recovery current. As will be noted, during this time, diode elements DQ2 and DQ3, as well as FETs Q2 and Q3, are conducting, while diodes D1 and D4, along with FETs Q1 and Q4, are in a non-conducting state.

During transition time T5, between periods P4 and P5, diodes D2 and D3 switch to a non-conducting state, as reflected T1 secondary winding load current increases to match the current in inductances L1 and L2. During transition time T5, FETs Q2 and Q3 remain conducting, while diodes D1 and D4, as well as FETs Q1 and Q4, remain non-conducting.

During time period P5, FET switches Q2 and Q3 remain controlled to an ON state, thus keeping voltage VA waveform low and voltage waveform VB high. The voltage supply from terminals 10 and 12 is therefore connected across the primary 42 of transformer T1 and the secondary winding load currents are reflected to the T1 primary winding 42, as well as to inductances L1 and L2. During this time, diodes D1, D2, D3, and D4, as well as FETs Q1 and Q4, remain non-conducting.

During transition time T6, between periods P5 and P6, FET switch Q2 is controlled to an OFF state, resulting in a linear transition to a high state of voltage waveform VA, thereby causing diode element DQ1, of FET Q1, to conduct. As may be observed, FET Q3 remains conducting while diodes D1, D2, D3, and D4, as well as FETs Q1 and Q4, remain non-conducting.

FET switch Q3 remains controlled to an ON state, during time period P6, resulting in keeping the voltage VB at junction point 38 high. The voltage VA at junction point 30 remains high as secondary winding 46 load currents reflected to the T1 primary winding 42 drive diode element DQ1, of FET Q1, into conduction, although FET Q1 itself remains non-conducting. Also, diodes D1, D2, D3, and D4, as well as FETs Q2 and Q4, are non-conducting.

In the transition time T7, between period P6 and a new period P1, FET switch Q3 is controlled to an OFF state, resulting in a voltage waveform VB resonant transition to a low state and causing diode element DQ4, of FET Q4, to conduct. FET switch Q4 is controlled to an ON state with ZVS and takes over conduction from diode element DQ4. Also at this time, FET switch Q1 is controlled to an ON state with ZVS and takes over conduction from diode element DQ1. The voltage supply of terminals 10 and 12 is therefore connected across the primary winding 42 of transformer T1 and the secondary winding rectifier reverse recovery and load currents are reflected to the T1 primary winding 42 and to inductances L1 and L2.

This results in diodes D1 and D4 conducting the T1 secondary rectifier reverse recovery current. Diode elements DQ1 and DQ4, as well as FETs Q1 and Q4, are conducting, while diodes D2 and D3, along with FETs Q2 and Q3, are in a non-conducting state.

As mentioned previously, the circuit operation is slightly different when the second primary clamp circuit comprising diodes D3, D4 and inductance L2 is not installed. This operational difference only occurs during time periods P4 through P6. The benefit with this configuration is the reduction in number of parts, although the physical size required of a single inductance will increase over that required with two clamp circuits.

During time period P4, FET switch Q2 is controlled to an ON state with ZVS and takes over conduction from diode element DQ2. Voltage waveform VA remains low and voltage VB remains high. The voltage supply is therefore connected across the primary 42 of transformer T1 and the load currents in secondary winding 46 are reflected to the T1 primary winding. Inductance L1 is energized with reflected T1 secondary winding rectifier reverse recovery current and, additionally, the load current. This results in diode element D2 conducting the T1 secondary winding rectifier reverse recovery current. As stated previously, diode D1 and FETs Q1 and Q4 are non-conducting during this period.

During the T5 transition time period from P4 to P5, diode D2 switches to a non-conducting state as reflected T1 secondary winding load current increases to match the current in inductance L1. The remaining components remain in the state of time period P4.

During time period P5, FET switches Q2 and Q3 remain controlled to ON states keeping voltage VA low and voltage VB high, as occurred in the previous description. The voltage supply is therefore connected across the primary winding 42 of transformer T1 and the secondary winding load currents are reflected to the T1 primary winding 42 and inductance L1.

During transition time T6, between periods P5 and P6, FET switch Q2 is controlled to an OFF state, resulting in voltage waveforms VA linear transition to a high state, thereby causing diode element DQ1, of FET Q1, to conduct. As may be observed, FET Q3 remains conducting while diodes D1, D2, as well as FETs Q1 and Q4, remain non-conducting.

In a manner similar to the previously discussed time period P6, FET switch Q3 remains controlled to an ON state, resulting in keeping the voltage VB at junction point 38 high. The voltage VA at junction point 30 remains high as secondary winding 46 load currents reflected to the T1 primary winding 42 drive diode element DQ1, of FET Q1, into conduction, although FET Q1 itself remains non-conducting. Also, diodes D1 and D2, as well as FETs Q2 and Q4, are non-conducting.

In the transition T7, between period P6 and a new period P1, FET switch Q3 is controlled to an OFF state, resulting in a voltage waveform VB resonant transition to a low state and causing diode element DQ4, of FET Q4, to conduct. FET switch Q4 is controlled to an ON state with ZVS and takes over conduction from diode element DQ4. Also at this time, FET switch Q1 is controlled to an ON state with ZVS and takes over conduction from diode element DQ1. The voltage supply of terminals 10 and 12 is therefore connected across the primary winding 42 of transformer T1 and the secondary winding rectifier reverse recovery and load currents are reflected to the T1 primary winding 42 and to inductance L1. This results in diode D1 conducting the T1 secondary rectifier reverse recovery current. Diode element FET Q2 remains non-conducting, as does diode D2.

From an understanding of the operation described above, it will be apparent that the operation of this circuit is generally similar to prior art phase shifted full bridge ZVS DC/DC converters. However, the simpler PWM control scheme and interaction of the components in the rectifier and filter block 48 with the primary clamp circuits results in less switch stress at light duty and minimizes reverse current spikes better than prior art circuits. From the discussion, it may be observed that the primary clamp circuit operates to minimize and circulate the reverse recovery switching currents generated by the output rectifiers and use this energy to supply current to output loads. As is known, prior art circuits had to use snubbing circuits to reduce the detrimental voltage breakdown effects of these transition time characteristics that are minimized by the primary clamp. Since the snubbing circuits act to dissipate this energy in the form of heat, energy is wasted. The present invention does not require such snubbing circuits, while remaining more energy efficient than the known prior art.

It should be realized, however, that while snubbing circuits are not required, the present inventive circuit can include snubbing circuits to even further reduce emi of the converter as compared to the converter without a snubbing circuit.

Although the invention has been described with reference to a specific embodiment, these descriptions are not meant to be construed in a limiting sense. Various modifications of the disclosed embodiments, as well as alternative embodiments of the invention, will become apparent to persons skilled in the art upon reference to the description of the invention. It is therefore contemplated that the claims will cover any such modifications or embodiments that fall within the true scope and spirit of the invention.

What is claimed is:

1. An LSL (Low Switching Loss) full bridge DC/DC converter, comprising:

first and second power input means for supplying a low ripple voltage to be converted to an isolated stable voltage;

first, second, third, and fourth switching devices interconnected to form a full bridge circuit between said first and second power input means, wherein each of said first, second, third, and fourth switching devices include a control input, switched power input and output terminals, a predetermined minimum capacitance and current blocking diode effect paralleled between said switched power input and output terminals and further wherein said first and third switching devices are connected to said first power input means and said second and fourth switching devices are connected to said second power input means;

a first bridge power output terminal interconnected to said first and second switching devices;

a second bridge power output terminal interconnected to said third and fourth switching devices;

first switching input means for providing an alternating voltage constant pulse width signal to said control input of said first and third switching devices;

second switching input means for providing an alternating voltage pulse width modulated control signal to said control input of said second and fourth switching devices;

an output transformer having primary and secondary windings;

a primary clamp circuit including at least one diode and an inductance;

means connecting said primary clamp circuit and the primary winding of said output transformer in series between said first and second bridge power output terminals; and output rectification circuitry, including at least a rectifier and an inductance, connected to said secondary winding of said output transformer.

2. Apparatus as claimed in claim 1 wherein the output rectification circuitry comprises current doubling circuitry connected to each end of said secondary winding of said output transformer and to a point intermediate first and second inductances.

3. Apparatus as claimed in claim 1 wherein said primary clamp circuit abets the LSL action in said switching devices.

4. Apparatus as claimed in claim 1 wherein said primary clamp circuit dampens the effect of reverse recovery currents in said converter that are generated by said output rectification circuitry during switching device state transitions.

5. An LSL (Low Switching Loss) full bridge DC/DC converter, comprising:

first and second power input means for supplying a low ripple voltage to be converted to a different level voltage;

a full bridge circuit, including first, second, third, and fourth semiconductor switching devices and bridge circuit power output terminals, connected between said first and second power input means;

means for supplying PWM control signals to at least one of said semiconductor switching devices and control signals of a second type to at least one other of said semiconductor switching devices;

an output transformer having primary and secondary windings;

output rectification circuitry, including at least a rectifier and an inductance, connected to said secondary winding of said output transformer; and a primary clamp circuit including an inductance for abetting LSL switching of said switching devices and/ or a diode for dampening the effect of reverse recovery currents in said converter that are generated by said output rectification circuitry during switching device state transitions.

6. A method of increasing power conversion efficiency in a full bridge DC/DC converter, including a transformer connected to an output rectification and filter stage, comprising the steps of:

applying a square wave signal to two switches of the full bridge converter;

applying a pulse width modulated signal to the remaining switches of the full bridge converter; and clamping reverse recovery switching currents generated by the output rectifiers.

7. A method of increasing power conversion efficiency in a full bridge DC/DC converter, including a transformer connected to an output rectification and filter stage, comprising the steps of:

applying a square wave signal to two switches of the full bridge converter;

applying a pulse width modulated signal to the remaining switches of the full bridge converter; and circulating reverse recovery switching currents whereby they are returned through the transformer to supply current to output loads.

8. A method of increasing power conversion efficiency in a full bridge semiconductor switched DC/DC converter, including a transformer secondary winding connected to an output rectification and filter stage and a primary winding connected to the bridge, comprising the steps of:

applying a square wave signal to two switches in opposite legs of the full bridge converter;

applying a pulse width modulated signal to the remaining switches of the full bridge converter; and reducing primary transition shoot through current resulting from reverse recovery of the transformer secondary rectification stage.

9. The method of claim 8 where the transition shoot current reduction is obtained via an inductor element and diode clamp circuit connected to the primary winding.

10. An LSL (Low Switching Loss) full bridge DC/DC converter, comprising:

first and second power input means for supplying a low ripple voltage to be converted to a second voltage level;

a full bridge circuit, including semiconductor switching devices and bridge circuit power output terminals, connected between said first and second power input means;

a supply of PWM control signals to at least one of said semiconductor switching devices;

a supply of constant width control signals to another of said semiconductor switching devices;

an output transformer having primary and secondary windings;

a primary clamp circuit, including an inductance and a diode for minimizing adverse effects of reverse recovery currents in said converter; and a connection of said primary winding of said output transformer and said primary clamp circuit in series to said power output terminals of said full bridge circuit.

11. Apparatus for increasing power conversion efficiency in a full bridge DC/DC converter, including a transformer connected to an output rectification and filter stage, comprising:

switching signal supply means for applying a square wave signal to two switches of the full bridge converter;

switching signal supply means for applying a pulse width modulated signal to the remaining switches of the full bridge converter; and means for clamping reverse recovery switching currents generated by the output rectifiers.

12. Apparatus for increasing power conversion efficiency in a full bridge DC/DC converter, including a transformer connected to an output rectification and filter stage, comprising:

switching signal supply means for applying a square wave signal to two switches of the full bridge converter;

switching signal supply means for applying a pulse width modulated signal to the remaining switches of the full bridge converter; and means for circulating reverse recovery switching currents whereby they are returned through the transformer to supply current to output loads.

13. Apparatus for increasing power conversion efficiency in a full bridge semiconductor switched DC/DC converter, including a transformer secondary winding connected to an output rectification and filter stage and a primary winding connected to the bridge, comprising:

switching signal supply means for applying a square wave signal to two switches in opposite legs of the full bridge converter;

switching signal supply means for applying a pulse width modulated signal to the remaining switches of the full bridge converter; and clamp means for reducing primary transition shoot through current resulting from reverse recovery of the transformer secondary rectification stage.

* * * * *